Patented July 14, 1942

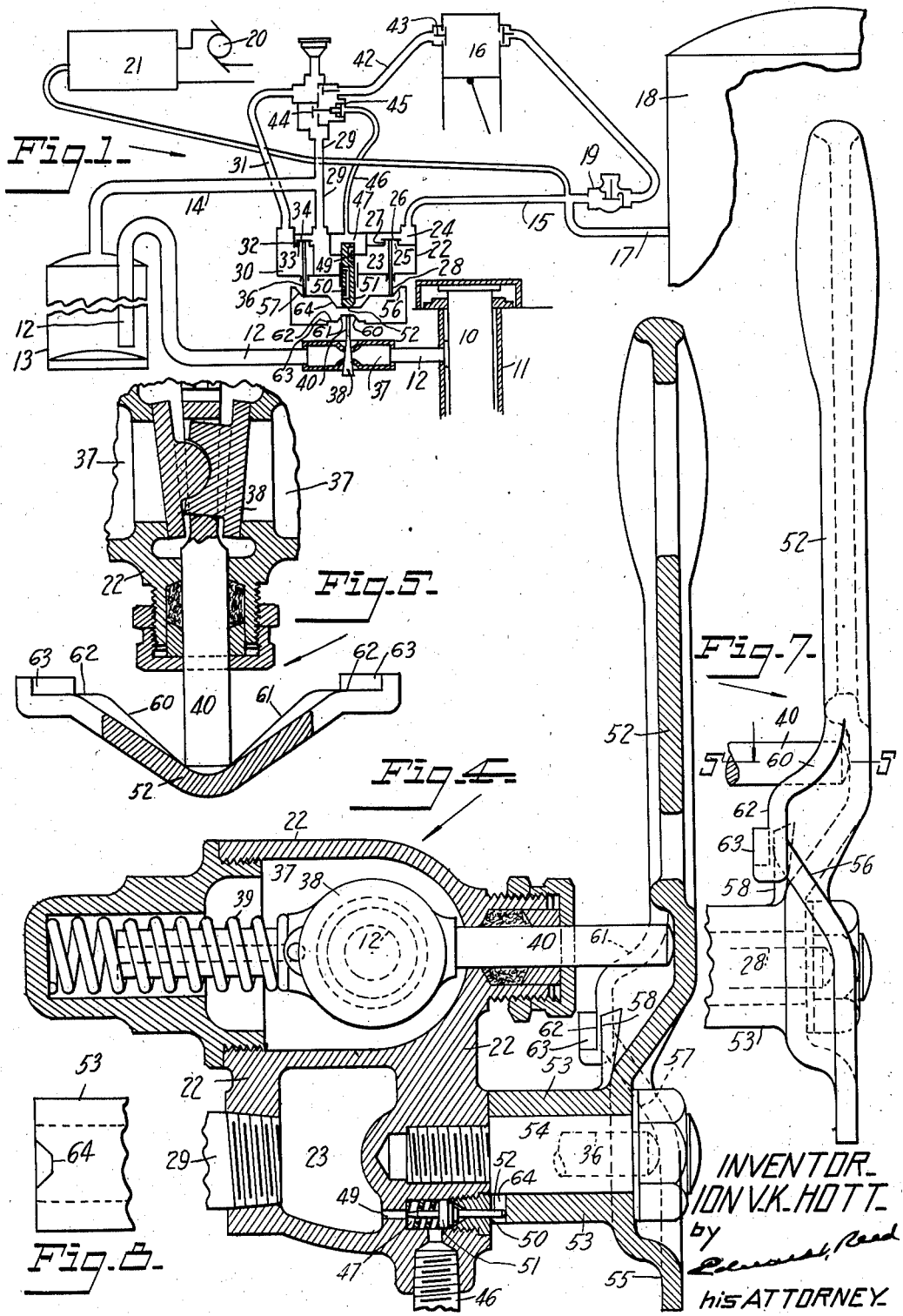

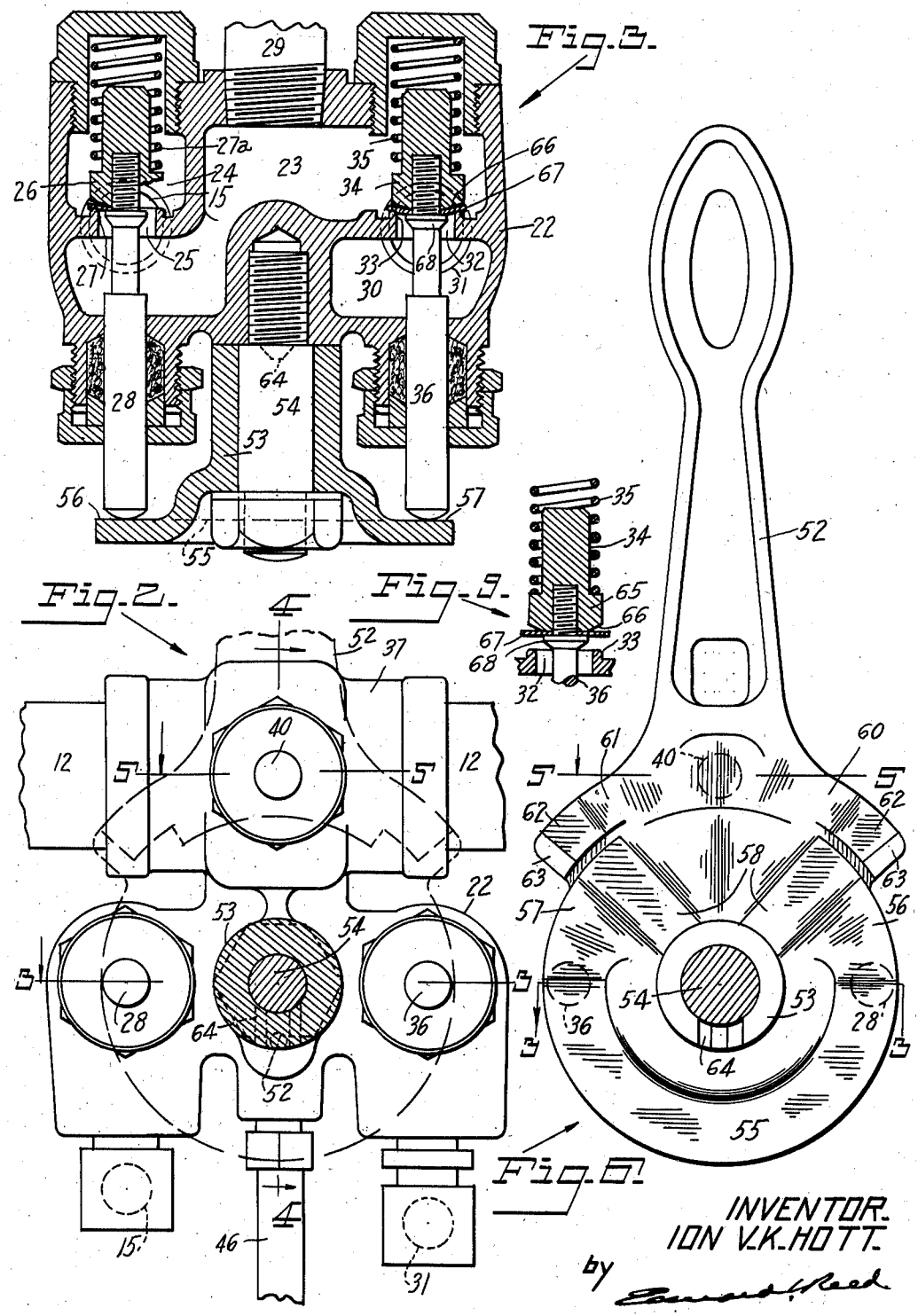

2,289,783

UNITED STATES PATENT OFFICE 2,289,783

VALVE MECHANISM

Ion Von Kert Hott, Dayton, Ohio, assignor to The Joyce-Cridland Company, Dayton, Ohio, a corporation of Ohio Application December 23, 1939, Serial No. 310,747

2 Claims. (Cl. 121—46.4)

This invention relates to valve mechanism and is in part a continuation of my application Serial No. 264,821, filed March 29, 1939, and issued as Patent No. 2,255,255 on Sept. 9, 1941. The mechanism herein illustrated is designed primarily for use in a lifting apparatus of the type in which the lift is elevated by liquid under air pressure, but it is not limited to use in such an apparatus.

One object of the invention is to provide a mechanism having a plurality of valves to separately control the flow of air and liquid and having a single device for actuating said valves in such sequence as to cause the lift to be elevated, retained in its elevated position and then lowered.

A further object of the invention is to provide such a mechanism which will be simple in construction, positive in operation and of such a character that it may be mounted in various positions with relation to the apparatus with which it is used.

A further object of the invention is to provide such a mechanism with an actuating device having three positions with relation to the valves and means whereby it is automatically retained in the position to which it has been moved until it is manually moved therefrom.

A further object of the invention is to provide such a mechanism with an improved air valve which will automatically adjust itself with relation to the valve seat.

Other objects of the invention may appear as the apparatus is described in detail.

In the accompanying drawings Fig. 1 is a schematic view showing the application of the valve mechanism to an automobile lift; Fig. 2 is a front elevation of the valve mechanism, partly in section; Fig. 3 is a section taken on the line 3—3 of Fig. 2; Fig. 4 is a section taken on the line 4—4 of Fig. 2, and including the actuating device; Fig. 5 is a section taken on the line 4—4 of Fig. 2 and partly broken away; Fig. 6 is a rear elevation of the actuating device; Fig. 7 is a side elevation of the actuating device; Fig. 8 is a detail view showing certain of the cam surfaces of the actuating device; and Fig. 9 is a detail view of one of the air valves.

For the purpose of explaining the function of the valve mechanism I have shown diagrammatically in Fig. 1 an automobile lift of a type to which the invention may be applied. As there shown, the lift comprises a ram 10 mounted for vertical movement in a cylinder 11 which is sunk in the ground and which is connected by a liquid conduit 12 with a liquid receptacle 13. This liquid receptacle is connected with a source of air supply by a suitable conduit which, as here shown, includes a pipe 14 connected with the air space in the upper part of the receptacle 13 and a supply pipe 15 connected with an air compressor 16. The pipe 15 is connected by a pipe 17 with an air storage reservoir 18 and a check valve 19 is interposed in the pipe 15 between the pipe 17 and the compressor. The compressor is operated by an electric motor 20 which is controlled by pressure operated switch mechanism enclosed in a casing 21 and which may be of the construction shown in the above mentioned application.

The flow of air and liquid through the respective conduits is controlled by the valve mechanism of the present invention. In the form here shown that mechanism comprises a valve housing 22 having an air passageway 23 which is provided at one end with an inlet chamber 24 which is connected with the pipe 15 leading to the compressor 16 and reservoir 18, and which also communicates with the air passageway 23 through a port 25. The port 25 is controlled by an inlet valve 26 mounted in the valve chamber 24 and adapted to engage a valve seat 27 surrounding the port 25. The arrangement of the valve is such that it will be held to its seat by air pressure but this pressure is preferably supplemented by a spring 27a to insure the proper seating of the valve. A valve stem 28 is connected with the valve 26, extends through the port 25 and through the front wall of the housing. The air passageway 23 has open communication with the air space in the liquid receptacle 13 through a pipe 29 with which the pipe 14 is connected. The valve housing is also provided with an exhaust valve through which air may be exhausted from the liquid receptacle 13 during the lowering of the ram and, as here shown, the housing has at that end of the air passageway opposite the inlet valve an exhaust chamber 30 which is in open communication with the atmosphere, as by a pipe 31, and is connected with the air passageway 23 by a port 32 having a valve seat 33 in the air passageway. An exhaust valve 34 is arranged in the air passageway to engage the seat 33 and will be normally held closed by the pressure in the air passageway but this pressure is supplemented by a spring 35. A stem 36 is connected with the exhaust valve 34 and extends through the port 32 and through the front wall of the housing.

The valve housing is also provided with a liquid passageway 37 which is interposed in the liquid conduit 12 and the flow of liquid through this passageway 37 is controlled by a suitable valve, here shown as a gate valve 38 which is held to its seat by a spring 39 and is provided with a stem 40 which extends through the front wall of the housing.

Thus it will be apparent that when the air inlet valve 26 and the liquid valve 38 are open, air under pressure will enter the liquid receptacle 13 and force the liquid therefrom into the cylinder 11 to elevate the ram. When the elevation of the ram has been completed the inlet and liquid valves are closed and the liquid is retained in the cylinder to hold the ram in its elevated position. At this time the air receptacle 13 contains a relatively large amount of air under pressure and in order to utilize the pressure energy of that air means are provided for returning the same to the intake of the compressor, as described in the above mentioned application. Briefly this means includes the pipe 14 leading from the liquid receptacle, the pipe 29 and a pipe 42 which is connected with the intake 43 of the compressor, the connection between the pipes 29 and 42 being controlled by a return valve 44 which is held closed by pressure in the pipe 29 and is opened by a fluid pressure operated device 45. This fluid pressure operated device is connected by an air conduit 46 with a valve chamber 47 in the valve housing 22, which is connected with the air passageway 23 by a port 49 and is connected with the atmosphere by a port 50. These ports are controlled by a supplemental valve 51 having a stem 52 extending through the front wall of the housing and so arranged that when the valve is in one position the fluid pressure operated device 45 will be connected with the air passageway of the main valve housing to receive air therefrom and when the supplemental valve is in the other position the supply of air to the pressure operated device will be cut off and that device will be vented.

The air under pressure is returned from the liquid receptacle to the compressor while the ram remains in its elevated position and when it is desired to lower the ram the liquid valve 38 is opened to permit the return of the liquid from the cylinder to the liquid receptacle and the exhaust valve 34 is opened to permit the low pressure air to escape from the liquid receptacle as the liquid returns thereto.

Suitable means are provided for actuating the several valves in proper sequence to effect these several operations and, as here shown, there is mounted on the valve housing an actuating device which comprises a lever 52 pivotally mounted on the housing for movement about an axis arranged substantially parallel with the stems of the several valves, it being noted that these stems are substantially parallel one with the other. In the present instance the lever is provided with a hub 53 which is rotatably mounted on a stud 54 rigidly secured to and extending forwardly from the housing 22, this stud being preferably mounted between the valve stems 28 and 36 of the air inlet and exhaust valves. It will also be noted that the stem 40 of the liquid valve is spaced vertically from the stems 28 and 36 and in a vertical plane extending between those valve stems, and that the stem 52 of the supplemental air valve 51 is arranged just below the stud 54. The actuating lever has its lower portion, which is mounted on the stud 54, enlarged to substantially a disk form, as shown at 55, and this enlarged portion is provided on its inner or rear face with diverging cam surfaces 56 and 57 arranged to engage respectively the valve stems 28 and 36. These cam surfaces merge into the plane of the disk 55 close to the respective valve stems 28 and 36 so that when the actuating lever is in a predetermined neutral position both valve stems will be released so that the inlet and exhaust valves will be seated by pressure thereon and this pressure holds the valve stems in engagement with the disk at the point where the cam surfaces merge into the same. Thus the valve stems will resist any tendency of the actuating lever to move from its neutral position until positive force is applied thereto. The cam surfaces 56 and 57 are provided at their outer ends with flat portions or dwells 58, one or the other of which will engage the valve stems associated therewith when the actuating lever has been moved to the limit of its movement in either direction from its neutral position and will thus not only hold that valve open but will prevent the stem from acting on the inclined position of the cam and will thus hold the actuating lever in the position to which it has been moved. The actuating lever is also provided at the upper portion of the disk with a segmental part 59 which is provided with converging cam surfaces 60 and 61 arranged on opposite sides of the stem 40 of the liquid valve and adapted to engage that stem and open the liquid valve when the lever is moved in either direction from its neutral position. This segmental portion is provided at the outer end of each cam surface with a flattened portion or dwell 62 to engage the stem and hold the liquid valve open and to retain the lever in its adjusted position, and at the outer end of each dwell a lug 63 is provided to positively limit the movement of the actuating lever in each direction. The hub 53 of the actuating lever is provided in its inner end with a V-shaped notch 64 into which the valve stem 52 of the supplemental valve extends and the inclined walls of this nut serve as cam surfaces to actuate that valve.

From the foregoing description it will be apparent that when the actuating device is in its neutral or upright position, as shown in the drawings, the air inlet valves and the liquid valve will be closed and the supplemental valve will be open to cause the return valve to be held in its opened position. When the actuating device is moved from its neutral position to the left, as shown in Fig. 1, the air inlet valve and liquid valve will be opened to cause the lift to be elevated and the supplemental air valve will be closed to permit the return valve to close during the raising of the lift. When the actuating device is returned to its neutral position the closing of the liquid valve will lock the lift in its elevated position and the opening of the supplemental valve will cause the return valve to be opened so that air under pressure can escape from the receptacle 13 to the compressor. When the actuating device is moved from neutral position to the right, as shown in Fig. 1, the air exhaust valve and the liquid valve will be opened to permit the liquid to return to the liquid receptacle and to permit the low pressure air to escape from that receptacle, and the supplemental valve will be closed to permit the return valve to close, and after the lift is lowered the actuating device is again returned to its neutral position. The cam surfaces and the dwells are so arranged that when the actuating device is in its neutral position or is in either of its operative positions it will be held in that position against the pressure of the valve stems on the actuating device.

For the purpose of insuring a tight closing of the air valves I have provided each air valve with a seat engaging member of resilient metal which is of such a character and so arranged that the pressure tending to move the valve to its closed position will cause the seat engaging member to uniformly and tightly engage the valve seat. The inlet and exhaust valves are identical in this respect and, with reference to the exhaust valve 34, it will be noted that the valve member comprises a body portion 65 and that the stem 36 is connected with the body portion by screw threading the end of the stem into the body portion at the center of the latter. That face of the body portion adjacent the valve seat is beveled about its entire circumference, as shown at 66, so that this beveled face slopes rearwardly from the valve stem. The resilient seat engaging member is in the form of a disk 67 having a central aperture through which the valve stem extends, the stem being provided with a shoulder 68 to engage the resilient disk and clamp the same tightly to the body portion of the valve member and when so clamped the outer portion of the disk is arranged between the valve seat and the beveled surface of the body portion of the valve member so that as it contacts with the valve seat it will automatically adjust itself to and tightly engage all parts of the valve seat.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In a valve mechanism comprising a housing having separate passageways for two fluids, inlet and exhaust valves to control the flow of fluid through one of said passageways, a cut-off valve to control the flow of fluid through the other of said passageways, and a supplemental valve to control the flow of fluid from one of said passageways to a device mounted exteriorly of said housing, said valves having substantially parallel stems, an actuating device movable about an axis substantially parallel with said valve stems in either direction from a normal position and having on one side thereof cam surfaces to engage and actuate the respective valve stems, said cam surfaces being so arranged about the axis of said actuating device that when the latter is in said normal position said inlet, exhaust and cut-off valves will be closed and said supplemental valve will be open, when said actuating device is moved in one direction from said normal position said inlet and cut-off valves will be opened and said supplemental valve will be closed and when said actuating device is moved in the other direction from said normal position said exhaust and cut-off valves will be opened and said supplemental valve will be closed.

2. In a valve mechanism, a housing having separate passageways for two fluids, inlet and exhaust valves to control the flow of fluid through one of said passageways, a cut-off valve to control the flow of fluid through the other of said passageways, and a supplemental valve to control the flow of fluid to a device mounted exteriorly of said housing, said inlet and exhaust valves having their stems spaced one from the other in a substantially horizontal plane, said cut-off valve having its stem arranged on one side of said horizontal plane and in a plane intersecting said horizontal plane between the first mentioned valve stems, said supplemental valve having its stem on that side of said horizontal plane opposite said cut-off valve stem and substantially in the last mentioned plane, said valve stems being substantially parallel one with the other, said housing having a bearing element arranged substantially at the point of intersection of said planes on an axis parallel with said valve stems, an actuating device mounted on said bearing element for pivotal movement in either direction from a normal position, said actuating device having cam surfaces on opposite sides of said cut-off valve stem and arranged to actuate the latter when said actuating device is moved in either direction from said normal position, having other cam surfaces both on the same side of said horizontal plane and arranged respectively to actuate said inlet valve stem when said actuating device is moved in one direction from said normal position and to actuate said exhaust valve stem when said actuating device is moved in the other direction from said normal position and having other cam surfaces arranged on the respective sides of said supplemental valve stem to actuate the latter when said actuating device is moved in either direction from said normal position.

ION VON KERT HOTT.